| United States Patent [19] | [11] | Patent Number: | 4,654,258 |
|---|---|---|---|
| Kawamata et al. | [45] | Date of Patent: | Mar. 31, 1987 |

[54] MAGNETIC RECORDING MEDIUM

[75] Inventors: Toshio Kawamata; Yasuo Nishikawa; Kazuhiko Morita, all of Kanagawa, Japan

[73] Assignee: Fuji Photo Film Co., Ltd., Kanagawa, Japan

[21] Appl. No.: 826,055

[22] Filed: Feb. 4, 1986

[30] Foreign Application Priority Data

Feb. 4, 1985 [JP] Japan .................................. 60-19740

[51] Int. Cl.$^4$ ......................... G11B 5/71; G11B 5/714; G11B 5/708
[52] U.S. Cl. .................................. 428/323; 252/62.54; 427/128; 428/694; 428/695; 428/900
[58] Field of Search ............... 428/694, 695, 900, 323, 428/408; 427/128; 252/62.54

[56] References Cited

U.S. PATENT DOCUMENTS 3,630,910 12/1971 Akashi et al. ..................... 252/62.54
4,474,848 10/1984 Yamaguchi et al. ................. 427/128
4,546,038 10/1985 Yamaguchi et al. ................ 428/694

FOREIGN PATENT DOCUMENTS 54-9041 4/1979 Japan .

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a non-magnetic support having provided thereon a magnetic layer containing ferromagnetic particles, a binder, non-magnetic particles, and lubricating agents, wherein said magnetic layer contains (i) carbon black (A) having an average particle size of 25 m$\mu$ or less and a BET specific surface area of from 150 to 250 m$^2$/g and carbon black (B) having an average particle size of from 10 to 30 m$\mu$ and a BET specific surface area of 700 m$^2$/g or more, and (ii) a fatty acid ester and a fatty acid amide in a total amount of 7 wt % or more based on the weight of the ferromagnetic particles.

14 Claims, No Drawings

MAGNETIC RECORDING MEDIUM

FIELD OF THE INVENTION

The present invention relates to a magnetic recording medium, such as a magnetic disk or a magnetic sheet, and more particularly it relates to a magnetic recording medium having improved durability.

BACKGROUND OF THE INVENTION

For a magnetic recording medium, particularly a magnetic disk or a magnetic sheet which is suitable for high density recording and is required to have high durability, both surface smoothness and durability thereof are required to be improved in order to improve electromagnetic properties thereof. However, conventional methods have not yet been able to fully meet the above requirement.

That is, in order to realize high density recording of a magnetic disk, it is important that the surface of a magnetic layer is smooth and that ferromagnetic particles are uniformly dispersed in the magnetic layer. However, sufficient durability of a magnetic layer has not so far been obtained by the use of fine magnetic particles, by improvements of smoothing treatment such as calendering treatment and by techniques for dispersing magnetic coating composition. Further, the thickness of the magnetic layer is forced to become thinner and thinner as high density recording has become further developed.

Generally used magnetic layers contain carbon black having an average particle size of about 10 m$\mu$ as an antistatic agent. Surface electric resistance of a magnetic layer having from 3 to 8 m$\mu$ thickness is generally controlled so that it is about from $1 \times 10^6$ to $1 \times 10^9$ $\Omega$. And when a magnetic layer is made thinner and the carbon black is used in the same content as before, the surface electric resistance becomes higher. In this case, in order to reduce the surface electric resistance, it is necessary that an amount of carbon black added are increased. It is known that since carbon black particles are finer than generally used pigments, carbon black is dispersed with difficulty, and further it deteriorates the dispersibility of magnetic particles and the surface properties of a coated surface of a magnetic recording medium. When carbon black is forcibly dispersed under improved dispersing conditions, the coated surface is made smoother, but durability of the magnetic layer decreases.

It is described in U.S. Pat. No. 3,630,910 that a fatty acid is used as the lubricating agent and that the total amount of the lubricating agent added is less than 7 wt%, with respect to the weight of the magnetic particles, in order to increase durability.

The amount of the lubricating agent is limited to less than 7 wt% because, when the lubricating agent is used in an amount of about 3 wt% or more, the magnetic layer of a video tape tends to become plasticized and experiences drop-outs, and when lubricating agents such as fatty acids and fatty acid esters are used, the magnetic layer tends to stick to the magnetic head in some cases. In the case of an audio tape, when a lubricating agent is used in an amount of about 6 wt% or more, the magnetic layer thereof tends to become plasticized, and tape squeal is easily generated by the influence of temperatures and humidities, $\mu$m value of the magnetic layer decreases, an edge of a tape which was wound to a reel disorderly waves by rubbing with a flange in running and white powers (i.e., scratched powders) generate, thereby tending to stain the magnetic head. A magnetic recording medium, particularly a magnetic disk which has high commercial value, must have a high durability such that the magnetic disk can continuously rotate more than 10,000,000 times. In such a case, satisfactory high durability has not yet been obtained when conventional binder composition is used and a lubricating agent is used in an amount of less than 7 wt% per ferromagnetic particles.

SUMMARY OF THE INVENTION

An object of the present invention is to provide a magnetic recording medium such as a magnetic disk or a magnetic sheet wherein electric resistance on the surface of a magnetic layer is suitably controlled and both the surface properties and the durability are simultaneously improved.

The inventors of the present invention have conducted extensive research as to the combined use of carbon black having different particle sizes, kinds of lubricating agents, and the added amounts thereof, and as a result thereof, they have attained the present invention.

The present invention is directed to a magnetic recording medium comprising a non-magnetic support having provided thereon a magnetic layer containing ferromagnetic particles, a binder, non-magnetic particles, and lubricating agents, wherein said magnetic layer contains (i) carbon black (A) having an average particle size of 25 m$\mu$ or less and a BET specific surface area of from 150 to 250 m$^2$/g and carbon black (B) having an average particle size of from 10 to 30 m$\mu$ and a BET specific surface area of 700 m$^2$/g or more, and (ii) a fatty acid ester and a fatty acid amide in a total amount of 7 wt% or more based on the weight of the ferromagnetic particles.

DETAILED DESCRIPTION OF THE INVENTION

The present invention is described in more detail below.

The two types of carbon black used in the present invention are: carbon black (A) having an average particle size of 25 m$\mu$ or less, and preferably from 16 to 20 m$\mu$, and having a BET specific surface area of from 150 to 250 m$^2$/g, and preferably from 180 to 230 m$^2$/g; and carbon black (B) having an average particle size of from 10 to 30 m$\mu$, and preferably from 20 to 30 m$\mu$, and having a BET specific surace area of 700 m$^2$/g, and preferably from 900 to 1,100 m$^2$/g. Typical examples of carbon black (A) having an average particle size of 25 m$\mu$ or less and from 150 to 250 m$^2$/g of BET specific surface area include "RAUEN 2100", "RAUEN 2000", "RAUEN 1800", "RAUEN 1500", "CONDUCTEX 950", and "CONDUCTEX SC", trademarks of products manufactured by Columbian Carbon Co., Ltd. and "HCF #2200B", "MCF #1000", "MCF #900", "MCF-88" and "MA 600", trademarks of the products manufactured by Mitsubishi Chemical Industries Ltd. Among these examples, "CONDUCTEX SC" is preferred. Typical examples of carbon black (B) having an average particle size of from 10 to 30 m$\mu$ and a BET specific surface area of 700 m$^2$/g or more include "ROYAL SPECTRA", "NEO SPECTRA MARK I", "NEO SPECTRA MARK II", "NEO SPECTRA AG", "SUPER SPECTRA" and "RAVEN 8000", trademarks of products manufactured by Columbian Carbon Co., Ltd., and "Ketjenblack EC", a trademark of the product manufactured by Lion Akzo Co., Ltd. And among these examples, "Ketjenblack EC" is preferred. These two types of carbon black are used in a total amount of from 1 to 25 wt%, and preferably from 5 to 15 wt%, based on the weight of the ferromagnetic particles. The mixing ratio of the two types of carbon black is optional, but the mixing ratio of carbon black (A) to carbon black (B) is preferably from 1/5 to 20/1, and more preferably from 1/3 to 10/1.

Lubricating agents used in the present invention include a fatty acid ester and a fatty acid amide and other lubricating agents can be added thereto, if desired.

The fatty acid ester includes an ester such as ethyl stearate, butyl stearate, amyl stearate, butyl palmitate, hexyl laurate, butyl laurate, or butyl myristate, and an alkoxy ester such as butoxy ethyl stearate, butoxy butyl stearate, ethoxy ethyl stearate, ethoxy butyl stearate, ethoxy butyl palmitate, or butoxy ethyl palmitate. Of these fatty acid esters, preferred are butyl stearate and butyl palmitate. A fatty acid amide includes stearyl amide, oleyl amide, erucyl amide, palmityl amide, and myristyl amide. Further, a fatty acid amide which is on the market includes Alflo P-10, Alflo E-10, and Alflo S-10, produced by Nippon Oil & Fats Co., Ltd., and Armoslip E, Armoslip O, and Armoslip Cp, produced by Lion-Akzo Co. Ltd. Of these fatty acid amides, preferred are oleyl amide, stearyl amide, and palmityl amide. These fatty acid ester and fatty acid amide must be contained in a total amount of 7 wt% or more based on the weight of the ferromagnetic particles.

Lubricating agents additionally added to the above lubricating agents include saturated or unsaturated fatty acid, fatty acid-modified silicones, α-olefin oxide, or saturated hydrocarbon. Non-magnetic particles having a Mohs' hardness of 6 or more are preferably added.

Non-magnetic particles having a Mohs' hardness of 6 or more are effective for the durability of a magnetic layer and these particles which are generally referred to as abrasive agents, such as, for example, $Cr_2O_3$, alumina, SiO, MgO, SiC, and TiC can be used. Non-magnetic particles having a Mohs' hardness of 6 or less are not effective for improving durability, and rather deteriorate it. The particle size of non-magnetic particles having a Mohs' hardness of 6 or more is preferably 1 μm or less, and more preferably from 0.2 to 0.7 μm. The amount of non-magnetic particles added is preferably 3 wt% or more, and particularly preferably from 6 to 15 wt% based on the weight of the ferromagnetic particles.

Non-magnetic supports used in the present invention are those that are conventionally used for a magentic recording media, such as polyethylene terephthalate, triacetyl cellulose, polyethylene naphthalate, polyamide, or polyimide. A polyester film vapour-deposited with Al can also be used.

In order to improve the surface properties of magnetic recording medium, the carbon black can be previously mixed with magnetic particles, binders, and organic solvents. In such a case, the whole amount or a part of the carbon black can be previously mixed. Like carbon black, amounts of magnetic particles and binders which are previously mixed can be adjusted. It is more effective that a whole amount of ferromagnetic particles are previously mixed. However, the previous mixing condition must be determined by the amounts and kinds of binders which are previously mixed. When carbon black is added only to improve surface smoothness of a magnetic layer, it is preferred that a whole amount of carbon black is introduced and previously mixed. When surface electric resistance of a magnetic layer is required to have a value lower than a certain predetermined value (i.e., $5 \times 10^9 \Omega$), it is preferred that a part of carbon black is previously mixed and the rest of the carbon black is introduced at a later step.

A three-roll mill, a pressure kneader, an open kneader, and Werner kneader are preferably used for previous mixing, although any devices which are generally used for kneading and mixing pigments can also be used in the present invention.

Solvents used for previous mixing include acetic acid esters such as ethyl acetate or butyl acetate, ketones such as methyl ethyl ketone, methyl isobutyl ketone, or cyclohexanone and solvents generally used for a magnetic tape.

Ferromagnetic particles used in the present invention include oxides such as $\gamma\text{-}Fe_2O_3$, $Fe_3O_4$, $CrO_2$, cobalt-containing $\gamma\text{-}Fe_2O_3$ or cobalt-containing $FeO_x$ ($x = 1.33$ to 1.5) and metal particles such as Fe-Ni, Fe-Ni-Co, Fe, or Fe-Co. These ferromagnetic particles have a mean length of from 0.1 to 1.0 μm and an acicular ratio (long axis/short axis) of from 2/1 to 15/1.

Binders used in the present invention include those that are conventionally used for a magnetic recording medium such as polyvinyl chloride, a copolymer of vinyl chloride, and vinyl acetate, a copolymer of vinyl chloride and vinyl acetate containing a carboxylic group, a copolymer of vinyl chloride and vinyl acetate containing vinyl alcohol, polyvinylidene chloride, a copolymer of vinylidene chloride, and acrylonitrile, nitrocellulose, and various cellulose derivatives, acrylonitrile and butadiene rubber, styrene and butadiene rubber, polyester, an epoxy resin, polyisocyanate polyurethane, or polyamide. The amount of binder used is generally from 15 to 50 wt% based on the weight of the ferromagnetic particles.

If desired, a plasticizer such as DBP (dibutyl phthalate) or TPP (triphenylphosphate) and a dispersing agent such as lecithin can also be mixed into a magnetic layer.

The thus-obtained magnetic recording medium such as a magnetic disk and a magnetic sheet has excellent surface smoothness and excellent durability of a magnetic layer.

The present invention is illustrated in more detail by the following Examples and Comparative Examples. In Examples and Comparative Examples, all parts are by weight.

EXAMPLE 1

| | |
|---|---|
| Co-containing $\gamma\text{-}Fe_2O_3$ (particle size: 0.4 μm × 0.04 μm | 100 parts |
| Copolymer of vinyl chloride and vinyl acetate ("VMCH", trademark of a product manufactured by Union Carbide Co., Ltd.) | 10 parts |
| Polyurethane ("N-2304", trademark of a product manufactured by Nippon Polyurethane Co., Ltd.) | 4 parts |
| Polyisocyanate ("Urecoat" B for "Mylar #1 Clear", trademark of a product manufactured by Higashi Nippon Toryo Co., Ltd.) | 8 parts |
| Carbon black (1) "CONDUCTEX SC" trademark of a product manufactured by Columbian | 8 parts |

-continued

| | |
|---|---|
| Carbon Co., Ltd., average particle size of 17 mμ, BET specific surface area 200 m²/g | |
| (2) "Ketjenblack EC", trademark of a product manufactured by Lion Akzo Co., Ltd., average particle size of from 20 to 30 mμ, BET specific surface area of 1000 m²/g | 3 parts |
| $Cr_2O_3$ (manufactured by Nippon Chemical Industrial Co., Ltd., average particle size of 0.5 μm, Mohs' hardness of from 8 to 9) | 5 parts |
| Ethoxybutyl stearate | 1 part |
| Ethoxy butyl palmitate | 4 parts |
| Butyl stearate | 3 parts |
| Erucyl amide | 3 parts |

Solvent: methyl ethyl ketone/toluene/methyl isobutyl ketone (mixing ratio: 2/2/1)

The above composition except polyisocyanate was roughly dispersed by a stirring device, and further dispersed and finely ground in a ball mill, and then polyisocyanate was added to the dispersing agent to adjust the viscosity so that the dispersing agent had a viscosity of 70 poise. After filtration, the magnetic composition was coated on a polyethylene terephthalate film having a thickness of 75 μm by a reverse roll coating method, which was then, dried and subjected to surface smoothing treatment using a super calender, which was processed to prepare a flexible disk of 5.25 inches. This sample was identified as Sample No. 1.

EXAMPLE 2

The same procedure as in Example 1 was repeated to prepare Sample Nos. 2 to 4, except that the kinds of carbon black were changed as shown in Table 1.

TABLE 1

| Sample No. | Kinds of carbon black | Amounts (parts) | Size (mμ) | BET specific surface area (m²/g) |
|---|---|---|---|---|
| 2 | (1) CONDUCTEX 950 | 8 | 21 | 245 |
|   | (2) NEO SPECTRA MARK I | 3 | 11 | 1065 |
| 3 | (1) RAVEN 1800 | 8 | 18 | 214 |
|   | (2) SUPER SPECTRA | 3 | 13 | 742 |
| 4 | (1) MCF 88 | 8 | 18 | 200 |
|   | (2) Ketjenblack EC | 3 | 20–30 | 1000 |

Comparative Example 1

The same procedure as in Example 1 was repeated to prepare Sample Nos. 5 to 8 except that the kinds of carbon black were changed as shown in Table 2.

TABLE 2

| Sample No. | Kinds of carbon black | Amounts (parts) | Size (mμ) | BET specific surface area (m²/g) |
|---|---|---|---|---|
| 5 | CONDUCTEX SC | 8 | 17 | 200 |
| 6 | Ketjenblack EC | 5 | 20–30 | 1000 |
| 7 | (1) Vulcan XC-72* | 8 | 30 | 254 |
|   | (2) Ketjenblack EC | 3 | 20–30 | 1000 |
| 8 | (1) CONDUCTEX SC | 8 | 17 | 200 |
|   | (2) Asahi #60* | 3 | 50 | 58 |

*Notes
Vulcan XC-72: trademark of a product manufactured by Cabot U.S.A.
Asahi #60: trademark of a product manufactured by Asahi Carbon Co., Ltd.

EXAMPLE 3

The same procedure as in Example 1 was repeated to prepare Sample Nos. 9 to 11 except that the kinds of lubricating agents were changed as shown in Table 3.

TABLE 3

| Sample No. | Lubricating agents | Amounts (part) |
|---|---|---|
| 9 | Amyl stearate | 3 |
|   | Butyl myristate | 2 |
|   | Oleyl amide | 4 |
| 10 | Butyl palmitate | 4 |
|   | Myristyl amide | 5 |
| 11 | Butyl stearate | 4 |
|   | Palmityl amide | 3 |
|   | Oleic acid | 2 |

Comparative Example 2

The same procedure as in Example 1 was repeated to prepare Sample Nos. 12 and 13 except that the added amounts of ethoxy butyl stearate, ethoxy butyl palmitate, butyl stearate, and erucyl amide were changed as shown in Table 4.

TABLE 4

| Sample No. | Ethoxy butyl stearate | Ethoxy butyl stearate | Butyl stearate | Erucyl amide |
|---|---|---|---|---|
| 12 | — | 2 | 2 | 2 |
| 13 | 0.5 | 1 | 1 | 1 |

Regarding Sample Nos. 1 to 13 prepared in Examples and Comparative Examples, durability and surface electric resistance thereof were measured by the method shown below using 5.25-inch floppy disk drive and the results are shown in Table 5.

TABLE 5

| Sample No. | Durability (number of rotations, × 10,000) | Surface electric resistance (Ω) | Example or Comparative Example |
|---|---|---|---|
| 1 | 2420 | $3 \times 10^6$ | Example |
| 2 | 2200 | $5 \times 10^7$ | " |
| 3 | 2280 | $1 \times 10^8$ | " |
| 4 | 2360 | $8 \times 10^6$ | " |
| 5 | 1520 | $9 \times 10^9$ | Comparative Example |
| 6 | 760 | $1 \times 10^4$ | Comparative Example |
| 7 | 1080 | $8 \times 10^5$ | Comparative Example |
| 8 | 1200 | $2 \times 10^{10}$ | Comparative Example |
| 9 | 2350 | $3 \times 10^6$ | Example |
| 10 | 2030 | $4 \times 10^6$ | " |
| 11 | 2350 | $2 \times 10^6$ | " |
| 12 | 980 | $2 \times 10^6$ | Comparative Example |
| 13 | 420 | $1 \times 10^6$ | Comparative Example |

The evaluations for the results shown in Table 5, were carried out in the following manner.

(1) Durability:

Durbility was indicated in terms of the number of rotations of each sample which had been rotating continuously using a floppy disk drive at 23° C. and 60% RH under 10 g/15 mm² pad pressure between a floppy disk drive and a floppy disk, until the output of a floppy disk decreased to 80% or less of an initial output. It is desirable that a commercially valuable magnetic disk has the number of rotation times of 10,000,000 or more.

(2) Surface electric resistance:

Surface electric resistance was measured using a digital super insulation resistance meter "TR-8611A", a trademark of the product manufactured by Takeda Riken. It is commercially desirable that a value of surface electric resistance is from $5 \times 10^5$ to $5 \times 10^9$ Ω.

It is clearly seen from the above results that Sample Nos. 1 to 4 and 9 to 11 exhibit excellent durability of 20,000,000 of rotations, as well as a desired surface electric resistance value of from $1 \times 10^8$ to $2 \times 10^6$ Ω. Durability of Sample Nos. 5 to 8 is inferior to Samples of the present invention. It is apparent from Comparative Examples that durability of Comparative Examples in which only one kind of carbon black "CONDUC-TEX SC" or "Ketjenblack EC" was used inferior to that of Examples of the present invention. A remarkable improvement of durability was obtained when the above two types of carbon black were used together, as is apparent from Sample No. 1 of Example 1. The reason was not clear, but it appears that good results can be obtained when a magnetic layer contained lubricating agents in a total amount of 7 wt% or more, and a mixture of the first carbon black having 25 mμ or less of an average particle size and having from 150 to 250 m²/g of specific surface area, and the second carbon black having an average particle size of from 20 to 30 mμ and having a BET specific surface area of 700 m²/g or more, and further an abrasive agent in combination.

It appears that when lubricating agents were used in an amount of less than 7 wt%, as in the case of Sample Nos. 12 and 13, durability was extremely decreased.

A magnetic recording medium prepared in accordance with the present invention has an desired surface electric resistance on a magnetic layer and has superior durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer containing ferromagnetic particles, a binder, non-magnetic particles, and lubricating agents, and wherein said magnetic layer contains additionally (i) carbon black (A) having an average from 150 to 250 m²/g and carbon black (B) having an average particle size of from 10 to 30 mμ and a BET specific surface area of 700 m²/g or more, and including as said lubricating agents (ii) a fatty acid ester and a fatty acid amide in a total amount of 7 wt% or more based on the weight of the ferromagnetic particles.

2. A magnetic recording medium as claimed in claim 1, wherein the non-magnetic particles in the magnetic layer have a Mohs' hardness of 6 or more.

3. A magnetic recording medium as in claim 1, wherein the total amount of the carbon black (A) and the carbon black (B) is from 1 to 25 wt% based on the weight of the ferromagnetic particles.

4. A magnetic recording medium as in claim 1, wherein the mixing ratio by weight of the carbon black (A) to the carbon black (B) is from 1/5 to 20/1.

5. A magnetic recording medium as in claim 2, wherein the particle size of the non-magnetic particles having a Mohs' hardness of 6 or more is 1 μm or less.

6. A magnetic recording medium as in claim 2, wherein the amount of the non-magnetic particles is 3 wt% based on the weight of the ferromagnetic particles.

7. A magnetic recording medium as in claim 1, wherein the fatty acid ester is selected from the group consisting of butyl stearate and butyl palmitate and the fatty acid amide is selected from the group consisting of oleyl amide, stearyl amide, and palmityl amide.

8. A magnetic recording medium comprising a non-magnetic support having provided thereon a magnetic layer containing ferromagnetic particles, a binder, non-magnetic particles, and lubricating agents, and wherein said magnetic layer contains additionally (i) carbon black (A) having an average particle size of from 16 to 20 mμ and a BET specific surface area of from 180 to 230 m²/g and carbon black (B) having an average particle size of from 20 to 30 mμ and a BET specific surface area of from 900 to 1,100 m²/g, and including as said lubricating agents (ii) a fatty acid ester and a fatty acid amide in a total amount of 7 wt% or more based on the weight of the ferromagnetic particles.

9. A magnetic recording medium as claimed in claim 8, wherein the non-magnetic particles in the magnetic layer have a Mohs' hardness of 6 or more.

10. A magnetic recording medium as in claim 8, wherein the total amount of the carbon black (A) and the carbon black (B) is from 5 to 15 wt% based on the weight of the ferromagnetic particles.

11. A magnetic recording medium as in claim 8, wherein the mixing ratio by weight of the carbon black (A) to the carbon black (B) is from 1/3 to 10/1.

12. A magnetic recording medium as in claim 8, wherein the fatty acid ester is selected from the group consisting of butylstearate and butylpalmitate and the fatty acid amide is selected from the group consisting of oleyl amide, stearyl amide, and palmityl amide.

13. A magnetic recording medium as in claim 9, wherein the particle size of the non-magnetic particles having a Mohs' hardness of 6 or more is from 0.2 to 0.7 μm.

14. A magnetic recording medium as in claim 9, wherein the amount of the non-magnetic particles is from 6 to 15 wt% based on the weight of the ferromagnetic particles.

* * * * *